Patented Apr. 22, 1924.

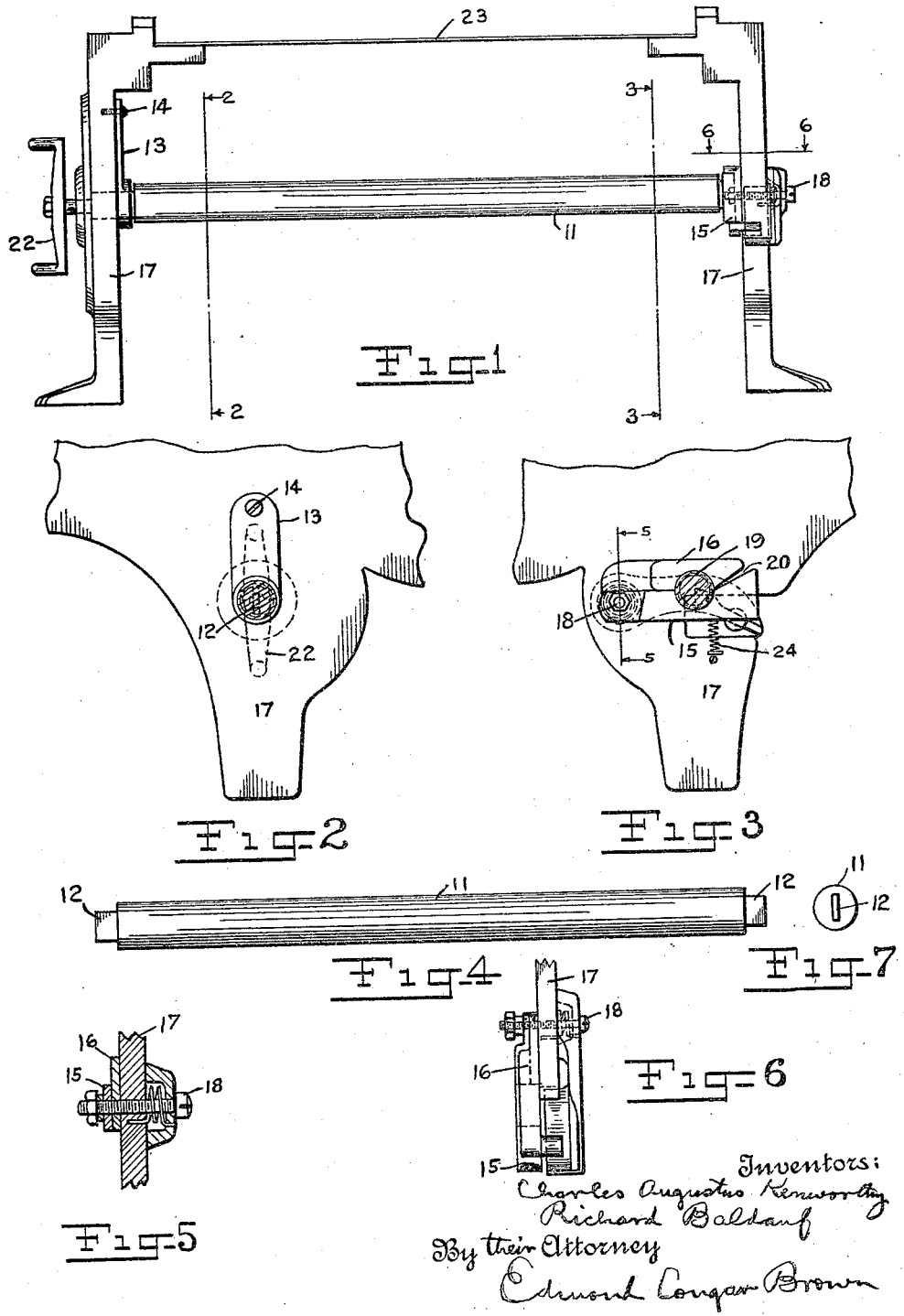

1,491,609

UNITED STATES PATENT OFFICE.

CHARLES AUGUSTUS KENWORTHY, OF EAST ORANGE, NEW JERSEY, AND RICHARD BALDAUF, OF GLENDALE, NEW YORK.

DUPLICATOR.

Application filed February 11, 1922. Serial No. 535,760.

*To all whom it may concern:*

Be it known that we, CHARLES AUGUSTUS KENWORTHY, a citizen of the United States, and a resident of East Orange, in the county of Essex and State of New Jersey, and RICHARD BALDAUF, a citizen of the United States, and a resident of Glendale, borough of Queens, city and State of New York, have invented certain new and useful Improvements in Duplicators, of which the following is a specification.

The invention relates to duplicators of that type in which a negative or reversed impression of matter to be copied is impressed upon an adhesive duplicating surface and positive impressions taken therefrom by bringing sheets of paper or the like into contact therewith, and more particularly to that form of such apparatus in which the adhesive duplicating suface is borne upon spools or rollers, being wound from one to the other over a bed upon which the portion of the duplicating surface which is in use rests. The invention has for one of its principal objects to provide simple and easily operated means adapted to journal such a spool or roller in the frame of the machine, so that the same may be readily inserted, rotated when desired, and removed from the machine.

The invention consists in the novel construction, arrangement and combination of various devices, elements and parts, as hereinafter set forth in the claims hereof, one embodiment of the same being illustrated in the accompanying drawings and described in this specification.

In the accompanying drawings, Fig. 1 is an end view of an apparatus embodying our invention;

Fig. 2 is a fragmentary vertical section taken along the line 2—2 of Fig. 1;

Fig. 3 is a fragmentary vertical section taken along the line 3—3 of Fig. 1;

Fig. 4 is a side view of the spool or roller;

Figs. 5 and 6 are fragmentary vertical and horizontal sections (the former along the line 5—5 of Fig. 3 and the latter along the line 6—6 of Fig. 1) of a portion of the right hand part of Fig. 1; and Fig. 7 is an end view of Fig. 4.

In carrying our invention into effect in the embodiment thereof which we have selected for description in this specification and illustration in the accompanying drawings, we provide a spool or roller for the duplicating strip of the form shown in Fig. 4 and also, in position in the duplicator, in Fig. 1. This roller comprises a main portion 11 and projecting bearing members 12 at each end, these being of elongated shape as shown more particularly in Fig. 7, so as to make them chuck-engaging members.

The spool is journaled in the frame of the machine as follows: At one side of the machine we provide an attachment, shown on the left in Fig. 1 and designated 13. The form of this is best shown in Fig. 2. It consists of a thin piece of metal, of an oval shape, secured to the frame of the duplicator at 14 and provided at its lower end with an opening large enough to receive the projection 12 on either end of the spool or roller. At the other side of the machine, shown on the right in Fig. 1, we provide devices for journaling the other end of the spool or roller. These devices are shown on an enlarged scale in side view in Fig. 3, in vertical section in Fig. 5 and looking down from above in Fig. 6. The devices comprise a stationary member 16 and a movable member 15, pivotally connected to the frame 17 by a screw 18. A circular socket or bearing is provided in these members, about half in each, and is designated as 19 in Fig. 3, and a tapering opening between the two parts is provided, designated as 20 in said figure, this being for the purpose of allowing one of the projections 12 on the spool or roller to be inserted in said opening 20 and down between the members 15 and 16 lowering the pivoted member 15, until the end of the spool passes into the circular opening 19 and is journaled therein as shown in Fig. 1. The member 15 is upheld by a spring 24 which tends to normally keep same in a closed position.

In the frame 17, on the left hand side in Fig. 1, an opening is provided adjacent the end of the spool or roller, in which opening is adapted to be placed a turnkey 22, the near end of which is provided with a slot adapted to engage with the projections 12 of the spools, whereby the same may be rotated.

It will be understood that the spools or rollers above mentioned are those upon which the duplicating strips are wound, and that the same passes from one of the said rollers up over the bed of the machine, designated 23, and is wound upon a similar roller at the other end of the machine. The winding from one roller to another is effected by the rotation of the rollers by means of the turnkey 22. In the use and operation of an apparatus constructed according to our invention, the rollers are inserted in the machine by placing the end shown at the left in Fig. 1 in the bearing formed in the member 13, and then slipping the projection 12 on the other end of this roller into the opening 20 between the members 15 and 16 and sliding same down until it becomes journaled in the circular bearing 19. In order to withdraw the roller, the pivoted member 15 is lowered sufficiently to allow the projection 12 to pass out of the bearing 19, whereupon the other end of the roller will be removed from its seat in the member 13.

The advantages of our invention will be obvious from what has been above said with regard to the construction and operation.

We do not limit ourselves to the exact form of construction which has been described and illustrated, as it is obvious that various changes can be made therein without departing from the spirit and scope of the invention.

Having thus described our invention, what we claim as new and desire to secure by Letters Patent is as follows:

1. An attachment for duplicators having a spool adapted to have wound thereon a duplicating film and provided with an angular projection at each end; comprising a member secured to the frame of the duplicator and provided with a semicircular opening in the lower side of the same, and a co-acting latch member pivotally secured to the frame of the duplicator and provided with a semicircular opening in the upper side of the same adapted to register with the opening in the first mentioned member, said semicircular openings forming together a bearing adapted to receive the projection on the end of said spool; said pivoted latch member being adapted to be moved in one direction to receive and to release the end of said spool and to be moved in another direction to hold the same in place when in operation.

2. An attachment for duplicators having a spool adapted to have wound thereon a duplicating film, and provided with a projection at each end adapted to engage with a chuck; comprising a member secured to the frame of the duplicator and provided with a semicircular opening in the lower side of the same, a co-acting latch member pivotally secured to the frame of the duplicator and provided with a semicircular opening in the upper side of the same adapted to register with the opening in the first mentioned member, and a spring tending to hold said latch member in closed position, said semicircular openings forming together a bearing adapted to receive the projection on the end of said spool; said pivoted latch member being adapted to be moved in one direction to receive and to release the end of said spool and to be moved in another direction to hold the same in place when in operation.

In witness whereof we have hereunto signed our names this 17 day of January, 1922.

CHARLES AUGUSTUS KENWORTHY.
RICHARD BALDAUF.